United States Patent [19]

Huang

[11] Patent Number: 5,390,394
[45] Date of Patent: Feb. 21, 1995

[54] DETACHABLE FRONT WHEEL ASSEMBLY FOR A STROLLER

[76] Inventor: Ming T. Huang, 4th Fl., No. 302, Sec. 7, Cheng Teh Rd., Taipei, Taiwan, Prov. of China

[21] Appl. No.: 129,356

[22] Filed: Sep. 30, 1993

[51] Int. Cl.[6] .............................................. B60B 33/00
[52] U.S. Cl. .......................................... 16/30; 16/20; 16/37; 16/38; 16/31 R; 16/43
[58] Field of Search ..................... 16/30, 37–39, 16/43, 20, 31 R

[56] References Cited

U.S. PATENT DOCUMENTS

| | | | |
|---|---|---|---|
| 1,929,743 | 10/1933 | Jarvis et al. | 16/43 |
| 3,197,802 | 8/1965 | Fontana et al. | 16/38 |
| 4,195,377 | 4/1980 | Kitchen et al. | 16/43 |
| 4,827,564 | 5/1989 | Brown | 16/37 |
| 5,062,178 | 11/1991 | Chiu | 16/43 |

FOREIGN PATENT DOCUMENTS 2343773 11/1991 United Kingdom ................... 16/43

*Primary Examiner*—Lowell A. Larson
*Assistant Examiner*—Donald M. Gurley
*Attorney, Agent, or Firm*—Morton J. Rosenberg; David I. Klein

[57] ABSTRACT

A front wheel assembly for a stroller includes a frame attaching member and a wheel attaching member. The frame attaching member includes a sleeve adapted to be securely attached to a front leg of a stroller and defining a through hole with upper and lower ends. A pair of diametrically opposed flexible tongues are formed on the upper end of the through hole with their distal ends radially extending over the through hole. The wheel attaching member includes a wheel seat adapted to mount a pair of front wheels of the stroller and a snapping member projecting upwardly from the wheel seat for releasably engaging with the flexible tongues. A number of flanges are formed around an outer periphery of the snapping member and are in rotational contact with the inner periphery of the through hole.

3 Claims, 3 Drawing Sheets

DETACHABLE FRONT WHEEL ASSEMBLY FOR A STROLLER

BACKGROUND OF THE INVENTION

1. Field of the Invention

The present invention relates to an improved detachable front wheel assembly for a stroller.

2. Description of Related Art

It is well known to have the front wheels detachably mounted to a stroller for transportation purpose, one type of which is disclosed in U.S. Pat. No. 4,969,230 to the applicant of this application. The present invention provides a novel design in this regard.

SUMMARY OF THE INVENTION

In accordance with one aspect of the present invention, a front wheel assembly for a stroller includes a frame attaching member and a wheel attaching member. The frame attaching member comprises a sleeve adapted to be securely attached to a front leg of a stroller and defining a through hole with upper and lower ends. A pair of diametrically opposed flexible tongues are formed on the upper end of the through hole with their distal ends radially extending over the through hole.

The wheel attaching member comprises a wheel seat adapted to mount a front wheel means of the stroller and a snapping member projecting upward from the wheel seat for releasably engaging with the flexible tongues. A plurality of flanges are formed around an outer periphery of the snapping member and in rotational contact/with the inner periphery of the through hole.

In accordance with another aspect of the invention, a plurality of strips are formed on the inner periphery of the through hole and extend along a longitudinal direction of the through hole, and the flanges on the snapping members are in rotational contact with the strips.

In accordance with a further aspect of the invention, the snapping member is made of plastic material and is hollow, and a rigid inert is securely fitted in the snapping member.

Other objects, advantages, and novel features of the invention will become more apparent from the following detailed description when taken in conjunction with the accompanying drawings.

DESCRIPTION OF THE PREFERRED EMBODIMENT

Figure 1:
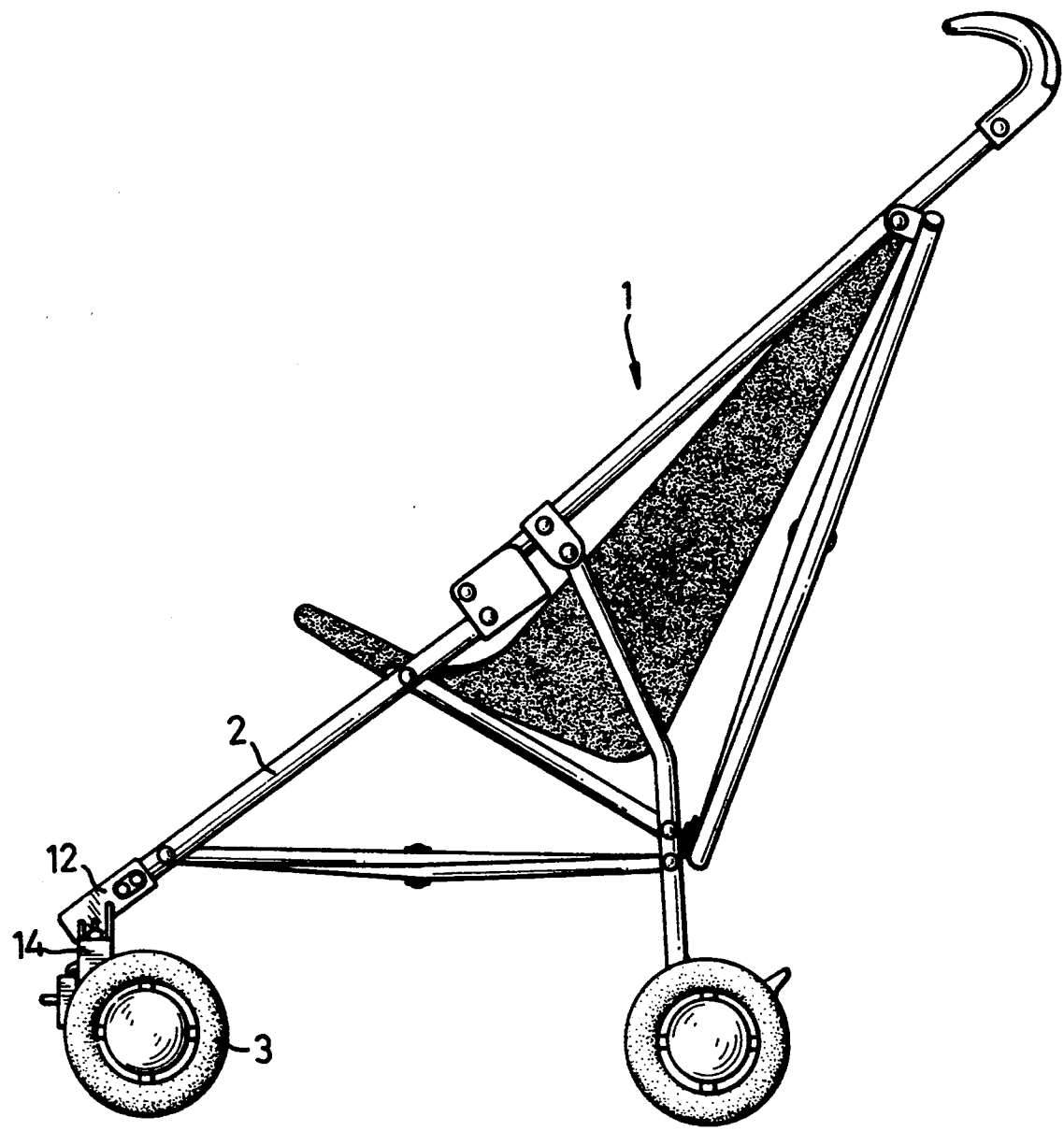
FIG. 1 is a side view of a stroller with a detachable front wheel assembly in accordance with the present invention.
Figure 2:
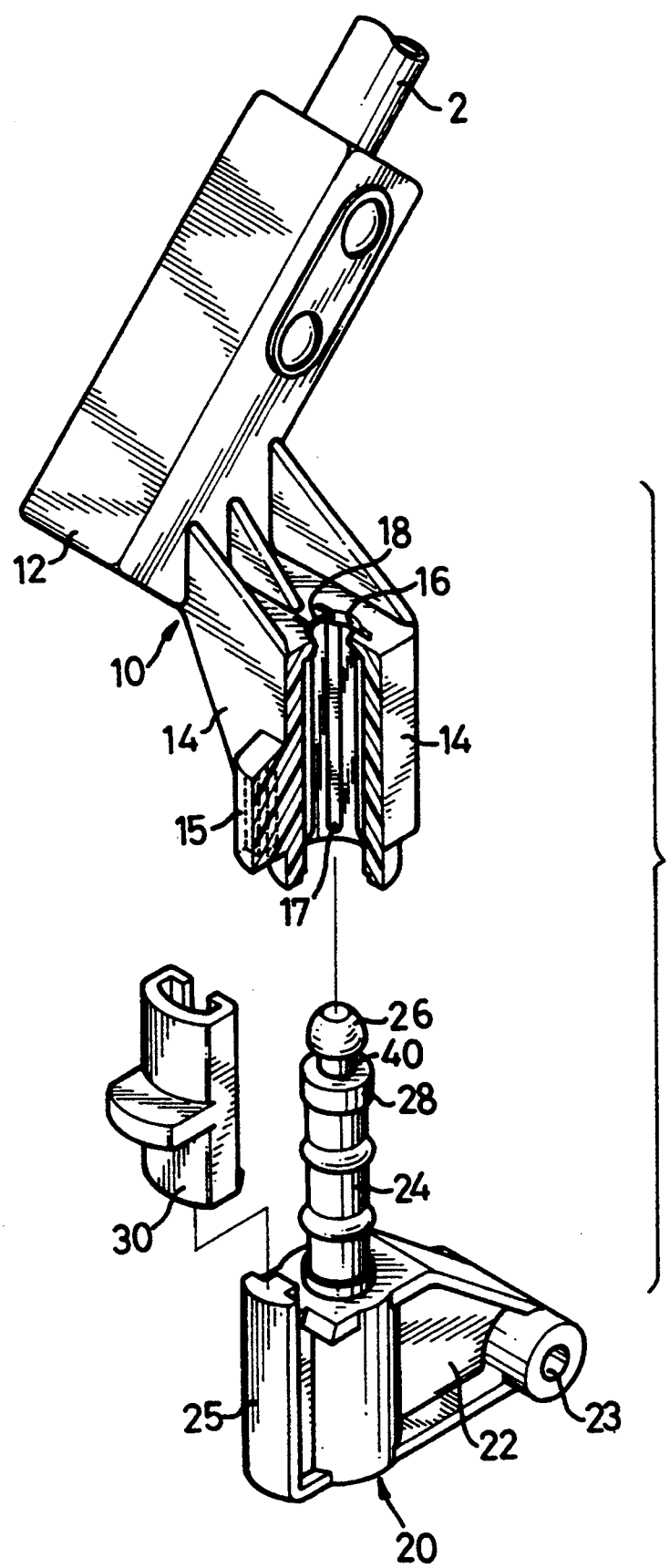
FIG. 2 is an exploded view, partly sectioned, illustrating the detachable front wheel assembly in accordance with the present invention.

Referring to FIGS. 1 and 2, a detachable front wheel assembly for a stroller 1 generally includes a frame attaching member 10 securely attached to a front leg 2 of the stroller 1 and a wheel attaching member 20 for removably mounting a pair of front wheels 3. In this embodiment, as shown in FIG. 2, the frame attaching member 10 is preferably a one-piece member and includes a first sleeve 12 for securely receiving the front leg 2 and a second sleeve 14 which defines a through hole 16 therein. A plurality of spaced strips 17 are formed on an inner periphery of and extend along a longitudinal direction of the through hole 16. A pair of diametrically opposed flexible tongues 18 are formed on an upper end of the through hole 16 with their distal ends radially extending over the through hole 16 to a desired extent.

Figure 3:
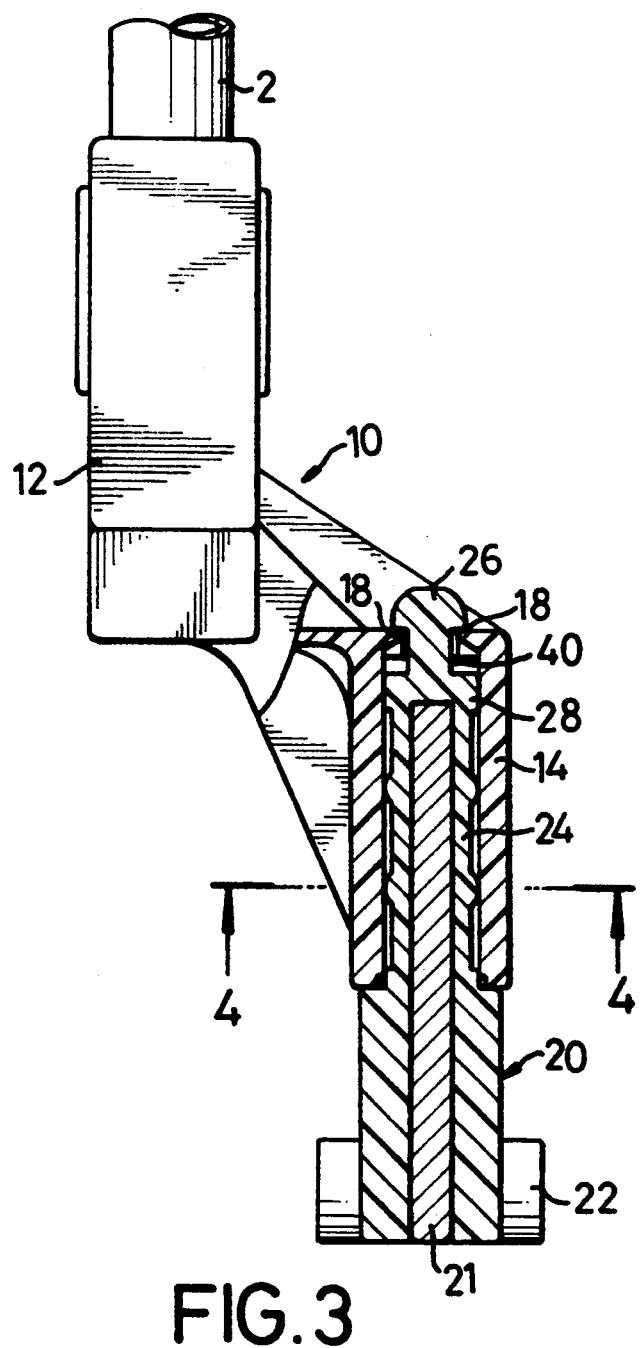
FIG. 3 is a side view, partly sectioned, of the detachable front wheel assembly in accordance with the present invention.

The wheel attaching member 20 is preferably a one-piece member and includes a wheel seat 22 and a snapping member 24 which projects upwardly from the wheel seat 22 with a distal snapping head 26 for releasably engaging with the flexible tongues 18. The wheel seat 22 includes a hole 23 for receiving a front wheel axle (not shown) so as to mount the front wheels 3 at both sides thereof, which is conventional and thus is not further described. A plurality of flanges 28 are formed around an outer periphery of the snapping member 24 and are so dimensioned to be in smooth contact with the strips 17 in the hole 16. The flanges 28 and snapping head 26 form a groove 40 within which the flexible tongues 18 are set as shown in FIGS. 2 and 3. By such an arrangement, the snapping member 24 is rotatably received in the hole 16, by means of which the front wheels 3 may turn smoothly to any desired orientation. The strips 17 may be omitted and the outer diameter of the flanges 28 may be enlarged to be fittingly yet rotatably received in the through hole 16. Preferably, a conventional locking member 30 may be provided to engage with member 15 on the second sleeve 14 and member 25 on the wheel attaching member 20, thereby locking the front wheels 3 to a frontward orientation.

Figure 4:
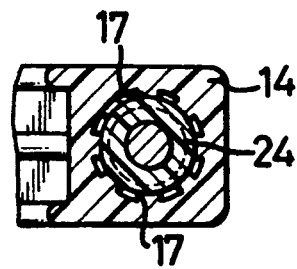
FIG. 4 is a cross-sectional view taken along line 4—4 in FIG. 3.

Referring now to FIGS. 3 and 4, in assembly, the wheel attaching member 20 is coupled to the frame attaching member 10 by inserting the snapping member 24 into the through hole 16 via a lower end of the through hole 16 and then forcibly passing the snapping head 26 through the flexible tongues 18. The whole wheel attaching member 20 is thus rotatably retained in position due to the provision of the snapping head 26 and the flexible tongues 18. Preferably, the length of the snapping member 24, ignoring the snapping head 26, is equal to the length of the through hole 16. Detachment of the wheel attaching member 20 may be achieved by forcibly pulling it downward to remove the snapping member 24 from the through hole 16.

The frame attaching member 10 and the wheel attaching member 20 are preferably made of plastic material and the snapping member 24 is hollow to reduce the weight thereof. Nevertheless, a rigid insert blade of steel, iron, or other suitable material is securely fitted into the snapping member 24 to reinforce the strength.

Although the invention has been explained in relation to its preferred embodiment, it is to be understood that many other possible modifications land variations can be made without departing from the spirit and scope of the invention as hereinafter claimed.

I claim

1. A front wheel assembly for a stroller comprising:
   a frame attaching member comprising a sleeve adapted to be securely attached to a front leg of a stroller, said sleeve defining a through hole with upper and lower ends, a plurality of diametrically opposed flexible tongues being formed on said upper end of said through hole with their distal ends radially extending over said through hole; and a wheel attaching member comprising a wheel seat adapted to mount a front wheel means of said stroller and a snapping member projecting upwardly from said wheel seat for releasably engaging with said flexible tongues, said snapping member having snapping head of a diameter large enough to displace said flexible tongues beneath said snapping head to retain said snapping head in said frame attaching member, a plurality of flanges being formed around an outer periphery of said snapping member and in rotational contact with said inner periphery of said through hole.

2. The front wheel assembly as claimed in claim 1 said through hole has a plurality of strips formed on an inner periphery thereof and extending along a longitudinal direction thereof, and said flanges on said snapping member being in rotational contact with said strips.

3. The front assembly as claimed in claim 1 wherein said snapping member is made of plastic material and is hollow, and a rigid insert being securely fitted in said snapping member.

* * * * *